United States Patent
Bar

[19]

[11] Patent Number: 6,145,034
[45] Date of Patent: Nov. 7, 2000

[54] METHOD AND APPARATUS FOR SWITCHING DATA RATES DURING BACK-UP BASED ON COMPUTER DATA AND SPEED

[75] Inventor: Refael Bar, San Diego, Calif.

[73] Assignee: Iomega Corporation, Roy, Utah

[21] Appl. No.: 08/950,461

[22] Filed: Oct. 15, 1997

[51] Int. Cl.[7] ................................................. G06F 13/00
[52] U.S. Cl. ............................ 710/60; 710/64; 710/74; 710/18; 710/48; 360/70; 360/74.1
[58] Field of Search .......................... 360/69–71, 74.1; 710/15–19, 48, 58–64, 72–74; 714/42

[56] References Cited

U.S. PATENT DOCUMENTS

| | | | |
|---|---|---|---|
| 3,673,345 | 6/1972 | Ban ........................................ | 360/73.05 |
| 3,692,255 | 9/1972 | Von Behren ............................. | 242/192 |
| 5,210,829 | 5/1993 | Bitner ....................................... | 395/25 |
| 5,270,875 | 12/1993 | Shah et al. ............................... | 360/46 |
| 5,303,095 | 4/1994 | Vuong ...................................... | 360/46 |
| 5,872,997 | 2/1999 | Golson .................................... | 398/872 |

*Primary Examiner*—Christopher B. Shin
*Attorney, Agent, or Firm*—Woodcock Washburn Kurtz MacKiewicz & Norris LLP

[57] ABSTRACT

A tape drive method and system for backing up data files from a hard drive to a tape drive or restoring data files to a hard drive from a tape drive. The data transfer rate of the tape drive is adjusted to minimize the number of times the tape drive switches off to wait for the hard drive to catch up to the tape drive. By minimizing the number of off occurrences of the tape drive, the back-up or restoration operation is completed more quickly.

24 Claims, 4 Drawing Sheets

METHOD AND APPARATUS FOR SWITCHING DATA RATES DURING BACK-UP BASED ON COMPUTER DATA AND SPEED

FIELD OF THE INVENTION

The present invention relates in general to cartridge based data storage systems. In particular, the present invention relates to tape cartridges and tape cartridge based drive systems that are used in back-up or restoration operations with respect to a computer hard drive. More particularly, the present invention relates to a method and apparatus for increasing the speed of back-up or restoration operations.

BACKGROUND OF THE INVENTION

Cartridge based tape and disk data storage devices have been in use in the computer industry for several decades. Primarily, the cartridge based tape storage devices have been used as sequential access devices, whereby new files are added to the tape by appending them to the last file stored on the tape. During that time, a number of tape cartridge styles emerged. One popular cartridge style is based on a design that is disclosed in U.S. Pat. No. 3,692,255 (Von Behren). That design contains two rotatable reels that are fixed within a rectangular housing. A length of tape is wound around the reels along a predetermined tape path, which extends along a front peripheral edge of the cartridge and across a tape access opening. A drive belt extends around drive belt rollers and contacts a portion of the tape on each reel to move the tape back and forth between the reels and across the tape access opening. A drive puck, positioned near the inside front of the cartridge, contacts a drive roller, which provides a mechanism to move the drive belt.

Tape cartridges and tape drives have become an increasingly important feature in computer systems. The popularity of tape cartridges is driven in part by the large storage capacities and low cost of storage they provide. In general, the storage capacity of a particular tape cartridge is dictated by a variety of factors including the length of tape, the width of the tape, the materials used to produce the tape and the recording density of the tape. Even with the cost and capacity advantages offered by tape storage solutions, the tape drive has primarily found use in computer systems as a back-up device, in which duplicates of files that were originally stored to a random access storage device, such as a hard disk drive, are stored for sequential access on a tape cartridge.

The popularity of these tape drives and cartridges have spawned several tape drive and cartridge standards. One popular tape drive and cartridge standard is defined in the specification entitled "QIC-3020-MC" Revision H, Mar. 20, 1996. That standard defines a variety of important features related to tape cartridges such as tape width, recording format, track format, segment format, and so on.

In a typical hard disk drive back-up procedure, files contained on a hard disk drive are stored on tape in a sequential fashion. That is, each new file is appended after the last file stored on the tape. Thereafter, in the event of a loss of files on the hard drive, the files can be retrieved from the tape and restored to the hard disk drive. Additionally, files that are accessed infrequently can be stored on tape and permanently removed from the hard drive. As a result, valuable hard disk file space is available for more immediate file needs. Because the back-up process can be performed as a background task, the speed of the tape access is generally not the primary concern of the user. Rather, capacity and storage cost are generally more important factors.

While tape storage systems have found substantial use as sequential access storage solutions, the use of tape systems as random access storage solutions has been hindered by slow file access speeds offered by tape storage systems. Tape drive file access speeds are affected by the amount of tape that can be moved across the tape access opening, referred to as tape displacement, and the amount of tape that must be displaced to reach a particular file. Currently available tape cartridges can contain in excess of 1000 feet of tape, and exemplary drives that use cartridges have displacement speeds on the order of about 7 feet per second. Thus, if the tape is positioned near the beginning of the tape and a requested file is near the end of the tape, the access time would take upwards of 140 seconds. For hard disk drive users, accustomed to access times on the order of milliseconds, 140 second access times are unbearable.

Throughput during back-up or restoration is dependent on the switching data rate of the tape drive and controller. During the back up or restoration of a small data file, the software in a computer typically is not able to keep up with the speed of the drive. Thus, the tape drive must stop to allow the computer to catch up. After the computer has caught up, the drive re-starts and needs to relocate. The starting and stopping of a tape drive between blocks of data is wasted time. The relocation of the drive upon re-start takes several seconds, which greatly affects the back-up or restoration time. During a back-up or restoration of many small data files, the relocation occurs many times, further delaying the back-up or restoration operation.

Although the art of tape drives is well developed, there remain some problems inherent in this technology, particularly with respect to the back-up or restoration time. Therefore, a need exists for a back-up and restoration method and apparatus that overcomes the drawbacks of the prior art.

SUMMARY OF THE INVENTION

The present invention is directed to a method for storing data files from a random access storage device to a cartridge containing a length of magnetically recordable tape having a number of segments, the cartridge being driven by a tape drive capable of being operated at a plurality of rates, comprising the steps of setting a data transfer rate to one of the rates of the tape drive; transferring data from at least one of the data files stored on the random access storage device to a storage area having a storage capacity; retrieving the data from the storage area at the data transfer rate and storing the data on the tape; and adjusting the data transfer rate. The step of setting the data transfer rate includes setting the data transfer rate to the highest rate of the plurality of rates. The step of retrieving the data includes switching the tape drive between an on state and an off state.

According to another aspect of the present invention, the switching of the tape drive is monitored, and the number of times the tape drive switches on and off is determined. The data transfer rate is decreased if the number of times is at least equal to a first predetermined number that is responsive to at least one of the number of segments, the tape length, the data files, and the storage capacity of the storage area. The data transfer rate is increased if the number of times is less than a second predetermined number, and is responsive to at least one of the number of segments, the tape length, the data files, and the storage capacity of the storage area.

A further embodiment within the scope of the present invention is directed to a method for storing data files from a cartridge containing a length of magnetically recordable tape having a number of segments, the cartridge being driven by a tape drive capable of being operated at a plurality of rates, to a random access storage device, comprising the steps of: setting a data transfer rate to one of the plurality of rates of the tape drive; transferring data at the data transfer rate from one of the data files stored on the tape to a storage area having a storage capacity; retrieving the data from the storage area and storing the data on the random access storage device; and adjusting the data transfer rate.

Another embodiment within the scope of this invention includes a tape drive system for providing digital data storage on a magnetic medium, comprising: a tape cartridge; a drive for writing and reading the tape cartridge at one of a plurality of data transfer rates, the driving being switchable between an on state and an off state; a data rate transfer controller for adjusting the data transfer rate of the drive; and means for determining when the drive switches to the off state. A means for counting a number of times the drive switches off is also provided. The data rate transfer controller adjusts the data transfer rate responsive to the number of times the drive switches off.

Another embodiment within the scope of this invention is directed to a tape drive system for storing data files from a random access storage device to a cartridge containing a length of magnetically recordable tape having a number of segments, the cartridge being driven by a tape drive capable of being operated at a plurality of rates, comprising: means for setting a data transfer rate to one of the plurality of rates of the tape drive; means for transferring data from at least one of the data files stored on the random access storage device to a storage area having a storage capacity; means for retrieving the data from the storage area at the data transfer rate and storing the data on the tape; and means for adjusting the data transfer rate.

Another embodiment within the scope of this invention is directed to a tape drive system for storing data files from a cartridge containing a length of magnetically recordable tape having a number of segments, the cartridge being driven by a tape drive capable of being operated at a plurality of rates, to a random access storage device, comprising: means for setting a data transfer rate to one of the plurality of rates of the tape drive; means for transferring data at the data transfer rate from at least one of the data files stored on the tape to a storage area having a storage capacity; means for retrieving the data from the storage area and storing the data on the random access storage device; and means for adjusting the data transfer rate.

The foregoing and other aspects of the present invention will become apparent from the following detailed description of the invention when considered in conjunction with the accompanying drawing.

DESCRIPTION OF EXEMPLARY
EMBODIMENTS AND BEST MODE

The present invention is directed to a method and apparatus for decreasing the back-up or restoration time of a hard disk drive using a tape cartridge drive that minimizes the number of "start-stop" occurrences of the tape drive during the back-up or restoration operation.

Throughout the description, the preferred embodiment of the invention is described in connection with a particular tape cartridge design. However, the cartridge used in the description is provided for exemplary purposes only, as the invention is applicable to other cartridge designs and to tape-based systems generally.

Figure 1:
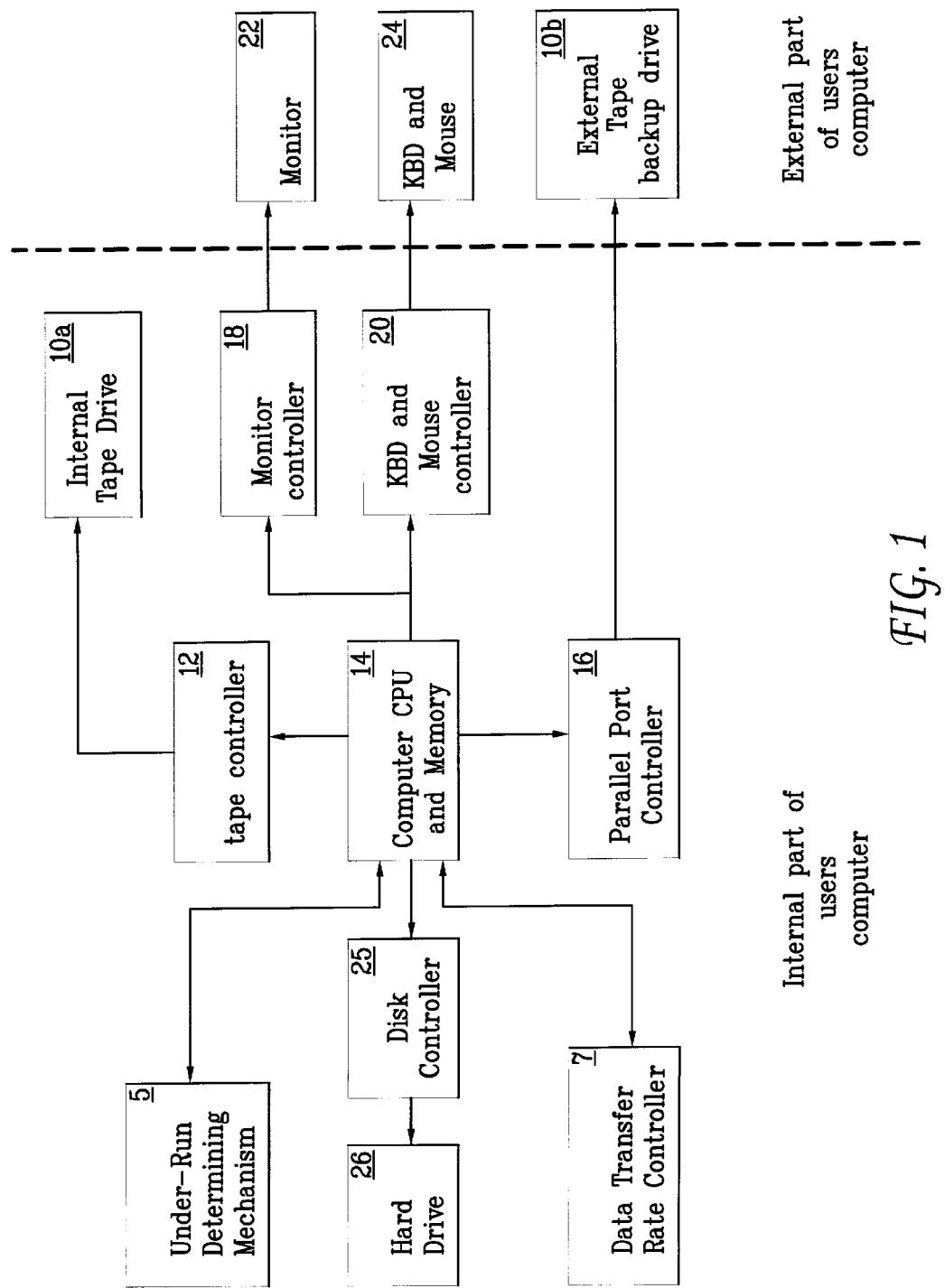
FIG. 1 is a block diagram of a computer system with a tape drive system in accordance with the present invention.

FIG. 1 is a block diagram of an exemplary computer system with tape drive systems in accordance with the present invention. As shown, the computer system is divided between internal and external components. The internal components include a CPU and memory 14 that control the overall functioning of the computer system. A tape controller 12 is connected between the CPU and memory 14 and an internal tape drive 10a. A hard disk drive 26 is also connected to CPU and memory 14. A disk controller 25 provides the interface between hard disk 26 and CPU and memory 14. An under-run determining mechanism 5 is connected to CPU and memory 14 for determining if an under-run has occurred. Other controllers are connected to CPU and memory 14 to provide an interface between a variety of external devices and CPU and memory 14. For example, a parallel port controller 16, a monitor controller 18, and a keyboard and mouse controller 20 each provide an interface between CPU and memory 14 and external tape drive 10b, monitor 22, and keyboard and mouse device 24, respectively. The exemplary system of FIG. 1 is configured with two tape drives 10 to emphasize that a method and an apparatus in accordance with the present invention can use a drive 10 that is implemented in either internal or external form. However, unlike the system depicted in FIG. 1, many computer systems will likely contain only an internal drive 10a or an external drive 10b, but not both. A data transfer rate controller 7 is connected to CPU and memory 14 to control the data transfer rate of the tape drives 10.

The computer system functions generally similar to the functioning of a standard computer system. An operating system, programs, and data files are stored on hard drive 26 for execution on CPU and memory 14. User interaction with the systems is provided by keyboard and mouse 24 and visual output is provided via monitor 22. As explained more fully below, tape drive 10 provides the function of allowing the user to back-up the files on hard disk drive 26 and restore files to the hard disk drive 26. CPU and memory 14 interact with the tape drive 10a and 10b to store files, back-up hard disk drive 26, and so on.

Figure 2:
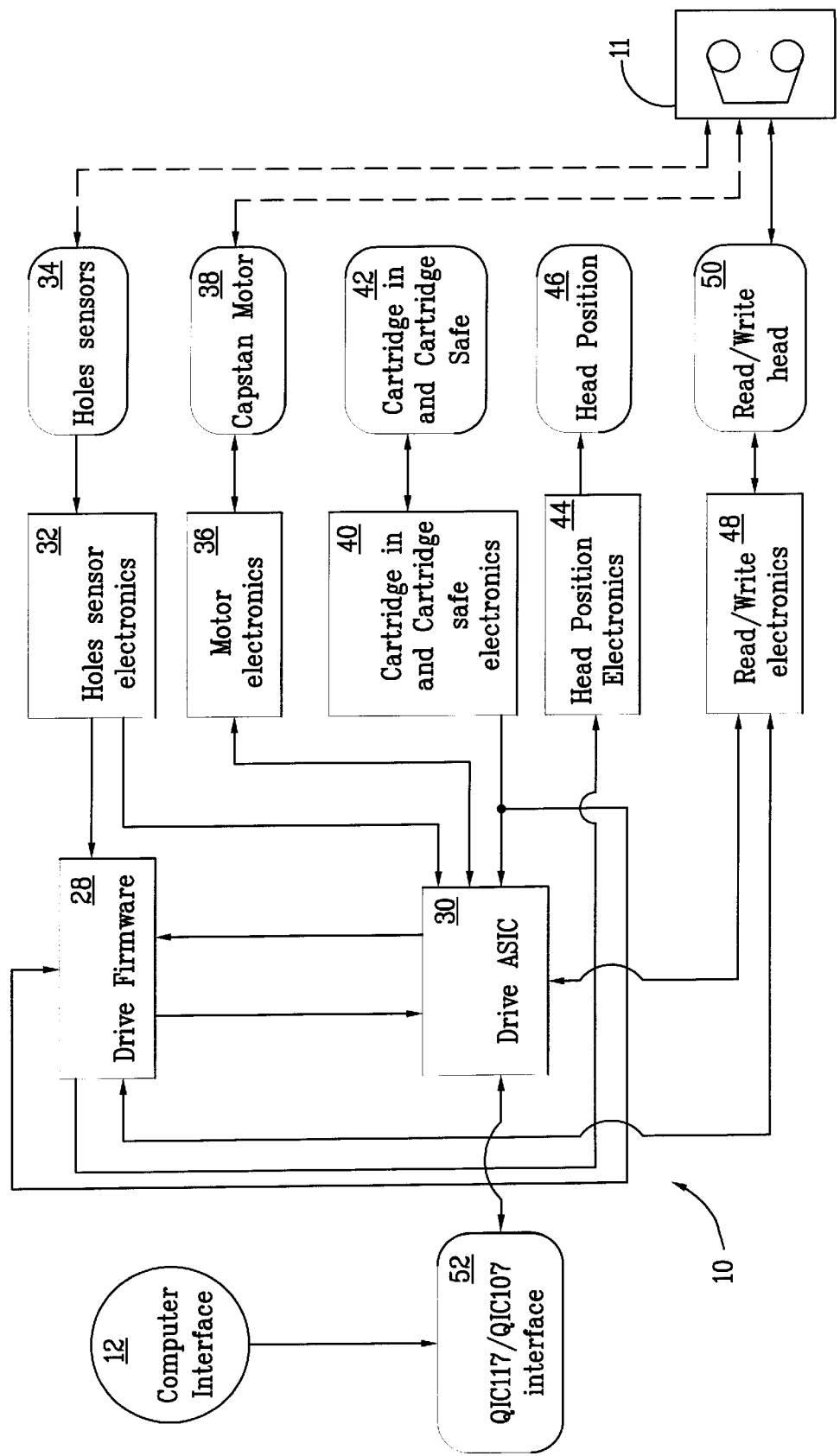
FIG. 2 is a block diagram of a tape drive system in accordance with the present invention.

Further details of tape drive 10 are shown in a block diagram form in FIG. 2. The tape drive system comprises two major components: A tape cartridge 11, which is further described below with reference to FIG. 3, and a tape drive 10. The drive electronics include a standard QIC117/QIC107 interface that comports with the QIC interface standard requirements, such as pin locations and voltage requirements, a drive application specific integrated circuit (ASIC) 30, which contains a microprocessor, memory, interface support circuitry, and other supporting circuitry, drive firmware 28, which contains program code to implement various drive functions, as described in further detail below, and tape interface electronics. The tape interface electronics further include hole sensor electronics 32 and hole sensors 34, motor electronics 36 and motor 38, cartridge load status electronics 40 and 42, head position electronics 44 and head positioning apparatus 46, and read/write electronics 48 and read/write head 50.

The operation of tape drive system 10 is in many aspects similar to conventional tape systems. When a tape cartridge 11 is inserted into drive 10, cartridge in and cartridge safe block 42 provides an output signal to the microprocessor contained in drive ASIC 30. Read/write head 50 interfaces with cartridge 11 to read and write data in response to user requests. Head position block 46 moves head 50 across the width of the tape for alignment of head 50 with a desired track. Capstan motor 38 provides the mechanical force to the cartridge 11 to move tape past read/write head 50. Hole sensors 34 detect holes located in the tape such as Beginning of Tape (BOT) holes, End of Tape (EOT) holes, and so on.

Figure 3:
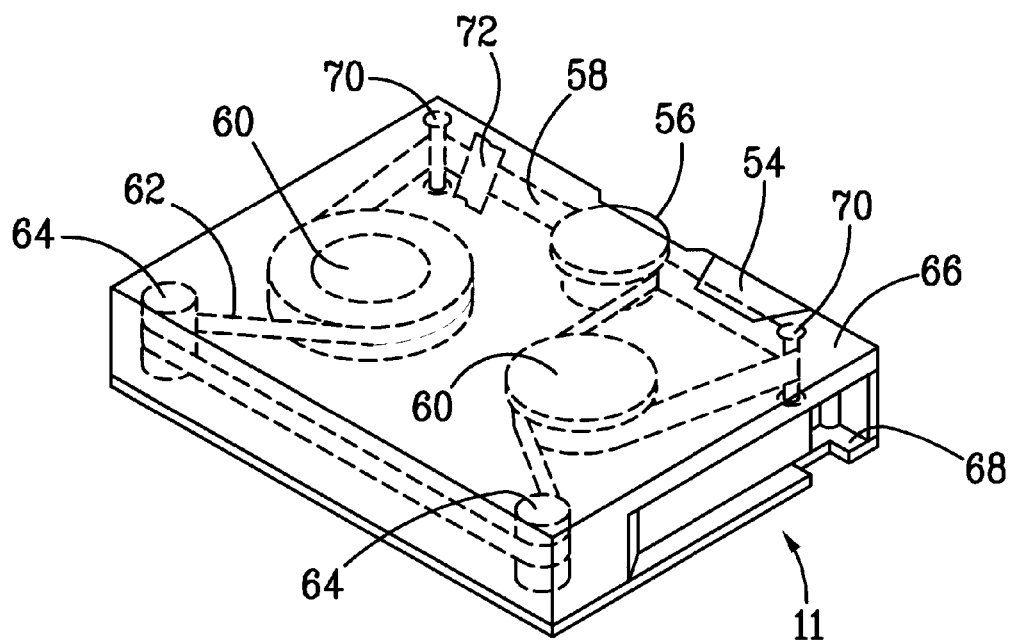
FIG. 3 is a perspective view of an exemplary tape cartridge employing aspects of the present invention.

An exemplary tape cartridge 11 for use with the present invention is depicted in FIG. 3. Those of ordinary skill in the art will appreciate that cartridge 11 shares many attributes of well-known and available tape cartridges. For example, cartridge 11 includes a pair of reels 60 that are rotatably disposed on a base 68 and has a length of tape 58 that is spooled around reels 60. Tape 58 follows a tape path between reels 60 that runs parallel to a head access opening 54 and around tape guides 70. A drive belt 62 follows a path around a drive capstan 56, which is rotatably disposed near a front peripheral edge of the cartridge 10, and drive rollers 64 such that a portion of belt 62 contacts the spools of tape for moving the tape back and forth between reels 60. A reflector 72, which is used to detect holes (not shown) in tape 58, is provided behind tape 58 along a front peripheral edge of cartridge 11. Lastly, a housing 66 is mounted over base 68 forming an outer shell of cartridge 11. There are other well-known components in cartridges of the type shown in FIG. 3 that are left out of the present description for clarity an brevity.

The operation of the tape system is best described with reference to FIGS. 2 and 3 together. Read/write head 50 of drive 10 engages the length of tape 58 of cartridge 11 at head access opening 54. Capstan motor 38 engages capstan 56 causing belt 62 to move across tape spools 60 thereby moving the tape 58 across read/write head 50. Hole sensor 34 operates in conjunction with reflector 72 to detect holes embedded through tape 58. Predefined hole patterns can be disposed along a predetermined length of tape 58 to indicate features of tape cartridge 11.

Figure 4:
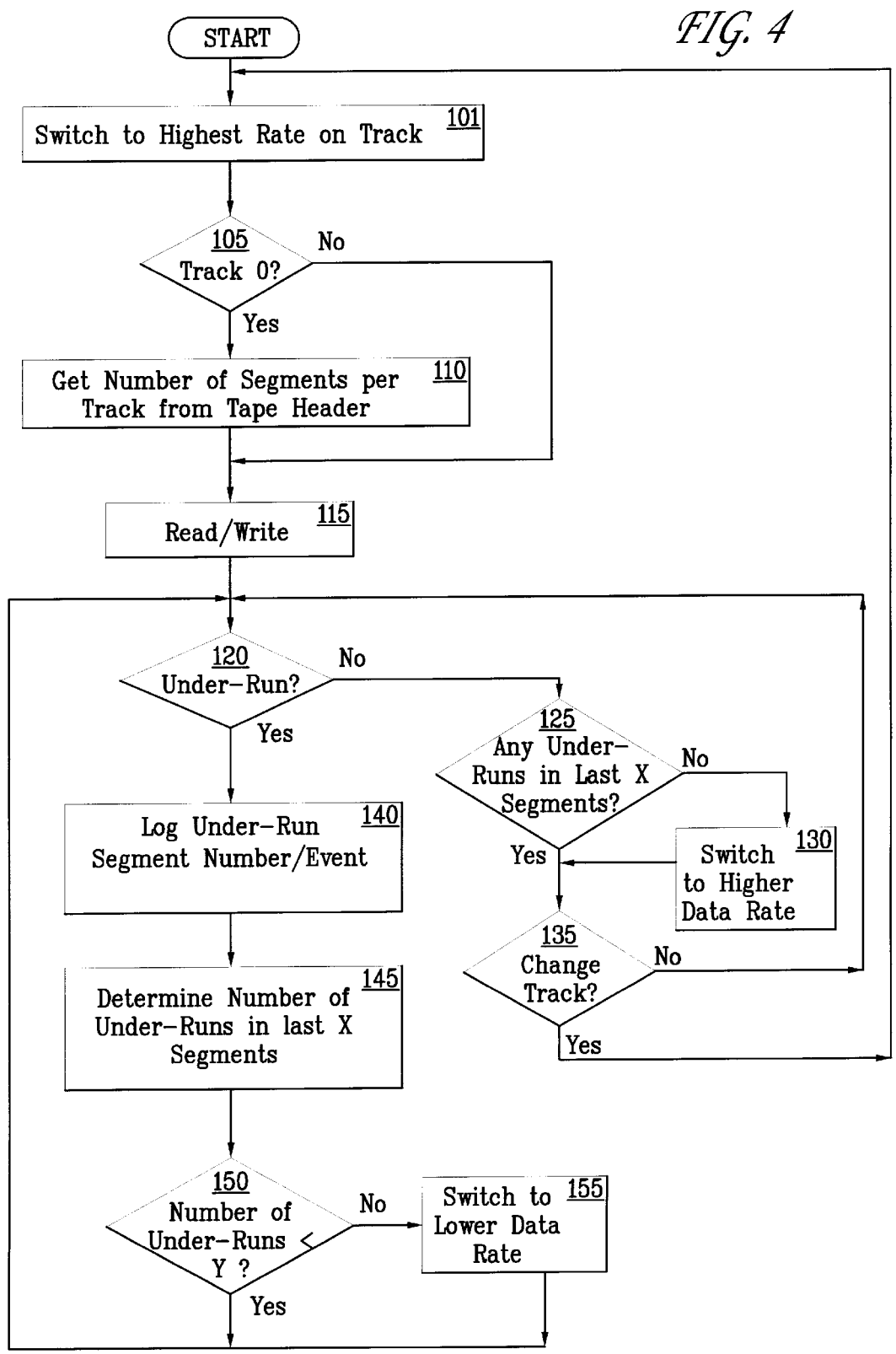
FIG. 4 presents a flow chart of an exemplary process in accordance with the present invention.

FIG. 4 presents a flow chart of an exemplary process in accordance with the present invention of (1) backing up a random access storage device, such as a hard drive, in which data files are read from a hard drive of a computer system, and written onto a tape cartridge via a memory 14 (i.e., a buffer memory) in the computer system or (2) restoring a random access storage device, such as a hard drive, in which files are read from a tape cartridge and written onto the hard drive via a buffer memory 14 in the computer system.

Initially, a tape cartridge 11 is inserted into tape drive 10. Thereafter, at step 101, the data transfer rate controller 7 of the computer system switches the data rate of the tape drive 10 for the file transfer to the highest rate of the tape drive 10. Typically, several data rates are available for use with a tape drive in accordance with the present invention, preferably 2, 3, 4, and 5 Mbits/sec.

At step 105, the computer system, which recognizes that a valid tape cartridge type is installed, commands drive 10 to reference tape 58 to determine which track number is being utilized. If the track is number zero, the computer system instructs the drive 10 to reference the tape header to obtain the number of segments per track, at step 110. Regardless of the track number, processing continues at step 115 by initiating reading data from the hard drive 26 to a buffer memory 14 in the computer (for back-up) or writing data to a buffer memory 14 in the computer from the tape drive 10 (for restoration). Data is then provided from the buffer memory 14 to the tape drive 10 (for back-up) or to the hard drive 26 (for restoration). As data is emptied from the buffer memory 14 to either the tape drive 10 or the hard drive 26, additional data is provided to the buffer memory from hard drive 26 (for back-up) or from the tape drive 10 (for restoration).

It is determined by the under-run determining mechanism 5 at step 120 whether an under-run has occurred. An under-run occurs when the tape drive 10 stops in order for the buffer memory 14 of the computer system to catch up with the tape drive 10. During back-up, an under-run occurs if the buffer memory 14 becomes empty and the drive 10 must wait for the buffer memory 14 to refill with data from the computer. In other words, the drive 10 removes data from the buffer 14 more quickly than the hard drive 26 can supply data to the buffer 14. During restoration, an under-run occurs if the buffer memory 14 remains full so that the drive 10 must stop and wait for the computer to empty it. In other words, the drive 10 provides data to the buffer 14 more quickly than the hard drive 26 can remove data from the buffer 14.

If there is no under-run, it is determined at step 125 whether there have been any under-runs in the last X segments, where X is a predetermined number indicative of an amount of displaced tape. X is related to at least one of the number of segments per track, the tape length, the number of files being transferred, the size of the files, and the size of the buffer memory 14. For example, X=number of segments per track/2.5, which has been determined experimentally to be the most preferable for decreasing overall data back-up/restoration times. If there has not been any under-runs in the last X segments, the data transfer rate of the tape drive 10 is increased to the next higher level by the data transfer rate controller 7, at step 130, if it is not at the highest level already. Thus, the data transfer rate is increased, thereby decreasing the transfer time. Regardless of whether there were any under-runs in the last X segments from step 125, it is determined at step 135 if there is a track change. If there is no track change, reading/writing continues with under-run checking at step 120. If there is a track change, processing returns to step 101.

If there is an under-run at step 120, the under-run segment number and event is logged at step 140. In other words, the segment number and event is stored by the computer system, preferably in software or in a memory. The total number of under-runs that occurred in the last X segments is then determined at step 145, where X is a predetermined number as described above, preferably X=number of segments per track/2.5. At step 150, if the number of under-runs is less than a number Y, then the data rate is maintained and reading/writing continues. Y is a predetermined number responsive to at least one of the of the number of segments per track, the tape length, the number of files being transferred, the size of the files, and the size of the buffer memory 14. The preferred value of Y is Y=X/15, which has been determined experimentally to be the most preferable for decreasing overall data back-up/restoration times. If the number of under-runs is not less than Y, at step 155, the data rate is switched to a lower data rate by the data transfer rate controller 7, if not already at the lowest rate, and reading/writing continues with under-run checking at step 120. In this manner, if there are too many under-runs occurring, the data transfer rate of the tape drive 10 is decreased. Although this increases the transfer time somewhat, any increase in transfer time is more than offset by the minimization of the number of tape drive start-stops.

By switching the data transfer rate in accordance with the present invention, the number of times a tape drive has to start and stop is minimized, thereby decreasing the back-up or restoration time.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method for storing data files from a random access storage device to a cartridge containing a length of magnetically recordable tape having a number of segments, said cartridge being driven by a tape drive capable of being operated at a plurality of rates, comprising the steps of:
   setting a data transfer rate to one of said plurality of rates of said tape drive;
   transferring data from said data files stored on said random access storage device to a storage area having a storage capacity;
   retrieving said data from said storage area at said data transfer rate and storing said data on said tape;
   switching said tape drive between an on state and an off state;
   determining a number of times said tape drive switches to said off state; and
   adjusting said data transfer rate comprising increasing the data transfer rate if said number of times is less than a first predetermined number.

2. A method according to claim 1, wherein said step of setting said data transfer rate includes setting said data transfer rate to a highest rate of said plurality of rates.

3. A method according to claim 1, further comprising the step of monitoring the switching of said tape drive.

4. A method according to claim 1, wherein said step of adjusting said data transfer rate includes decreasing said data transfer rate if said number of times is at least equal to a second predetermined number.

5. A method according to claim 4, wherein said second predetermined number is responsive to at least one of said number of segments, said tape length, said data files, and said storage capacity of said storage area.

6. A method according to claim 1, wherein said first predetermined number is responsive to at least one of said number of segments, said tape length, said data files, and said storage capacity of said storage area.

7. A method for storing data files from a cartridge containing a length of magnetically recordable tape having a number of segments, said cartridge being driven by a tape drive capable of being operated at a plurality of rates, to a random access storage device, comprising the steps of:
   setting a data transfer rate to one of said plurality of rates of said tape drive;
   transferring data at said data transfer rate from said data files stored on said tape to a storage area having a storage capacity;
   switching said tape drive between an on state and an off state;
   determining a number of times said tape drive switches to said off state;
   retrieving said data from said storage area and storing said data on said random access storage device; and
   adjusting said data transfer rate comprising increasing the data transfer rate if said number of times is less than a first predetermined number.

8. A method according to claim 7, wherein said step of setting said data transfer rate includes setting said data transfer rate to a highest rate of said plurality of rates.

9. A method according to claim 8, further comprising the step of monitoring the switching of said tape drive.

10. A method according to claim 8, wherein said step of adjusting said data transfer rate includes decreasing said data transfer rate if said number of times is at least equal to a second predetermined number.

11. A method according to claim 10, wherein said second predetermined number is responsive to at least one of said number of segments, said tape length, said data files, and said storage capacity of said storage area.

12. A method according to claim 7, wherein said first predetermined number is responsive to at least one of said number of segments, said tape length, said data files, and said storage capacity of said storage area.

13. A tape drive system for storing data files from a random access storage device to a cartridge containing a length of magnetically recordable tape having a number of segments, said cartridge being driven by a tape drive capable of being operated at a plurality of rates, comprising:
   means for setting a data transfer rate to one of said plurality of rates of said tape drive;
   means for transferring data from said data files stored on said random access storage device to a storage area having a storage capacity;
   means for retrieving said data from said storage area at said data transfer rate and storing said data on said tape;
   means for switching said tape drive between an on state and an off state;
   means for determining a number of times said tape drive switches to said off state; and
   means for adjusting said data transfer rate comprising means for increasing the data transfer rate if said number of times is less than a first predetermined number.

14. A tape drive system according to claim 13, wherein said means for setting said data transfer rate includes means for setting said data transfer rate to a highest rate of said plurality of rates.

15. A tape drive system according to claim 13, further comprising means for monitoring the switching of said tape drive.

16. A tape drive system according to claim 13, wherein said means for adjusting said data transfer rate includes means for decreasing said data transfer rate if said number of times is at least equal to a second predetermined number.

17. A tape drive system according to claim 16, wherein said second predetermined number is responsive to at least one of said number of segments, said tape length, said data files, and said storage capacity of said storage area.

18. A tape drive system according to claim 13, wherein said first predetermined number is responsive to at least one of said number of segments, said tape length, said data files, and said storage capacity of said storage area.

19. A tape drive system for storing data files from a cartridge containing a length of magnetically recordable tape having a number of segments, said cartridge being driven by a tape drive capable of being operated at a plurality of rates, to a random access storage device, comprising:
   means for setting a data transfer rate to one of said plurality of rates of said tape drive;
   means for transferring data at said data transfer rate from said data files stored on said tape to a storage area having a storage capacity;

means for switching said tape drive between an on state and an off state;

means for determining a number of times said tape drive switches to said off state;

means for retrieving said data from said storage area and storing said data on said random access storage device; and means for adjusting said data transfer rate comprising means for increasing the data transfer rate if said number of times is less than a first predetermined number.

20. A tape drive system according to claim 19, wherein said means for setting said data transfer rate includes means for setting said data transfer rate to a highest rate of said plurality of rates.

21. A tape drive system according to claim 19, further comprising means for monitoring the switching of said tape drive.

22. A tape drive system according to claim 19, wherein said means for adjusting said data transfer rate includes means for decreasing said data transfer rate if said number of times is at least equal to a second predetermined number.

23. A tape drive system according to claim 22, wherein said second predetermined number is responsive to at least one of said number of segments, said tape length, said data files, and said storage capacity of said storage area.

24. A tape drive system according to claim 19, wherein said first predetermined number is responsive to at least one of said number of segments, said tape length, said data files, and said storage capacity of said storage area.

* * * * *